Dec. 21, 1965     L. A. EIBEN     3,224,172

DUST COLLECTING APPARATUS

Filed Aug. 17, 1961     5 Sheets-Sheet 1

INVENTOR.
LAWRENCE A. EIBEN

BY

Teare, Fetzer & Teare
ATTORNEYS

Dec. 21, 1965  L. A. EIBEN  3,224,172
DUST COLLECTING APPARATUS
Filed Aug. 17, 1961  5 Sheets-Sheet 2

INVENTOR.
LAWRENCE A. EIBEN
BY
Teare, Felzer & Teare
ATTORNEYS

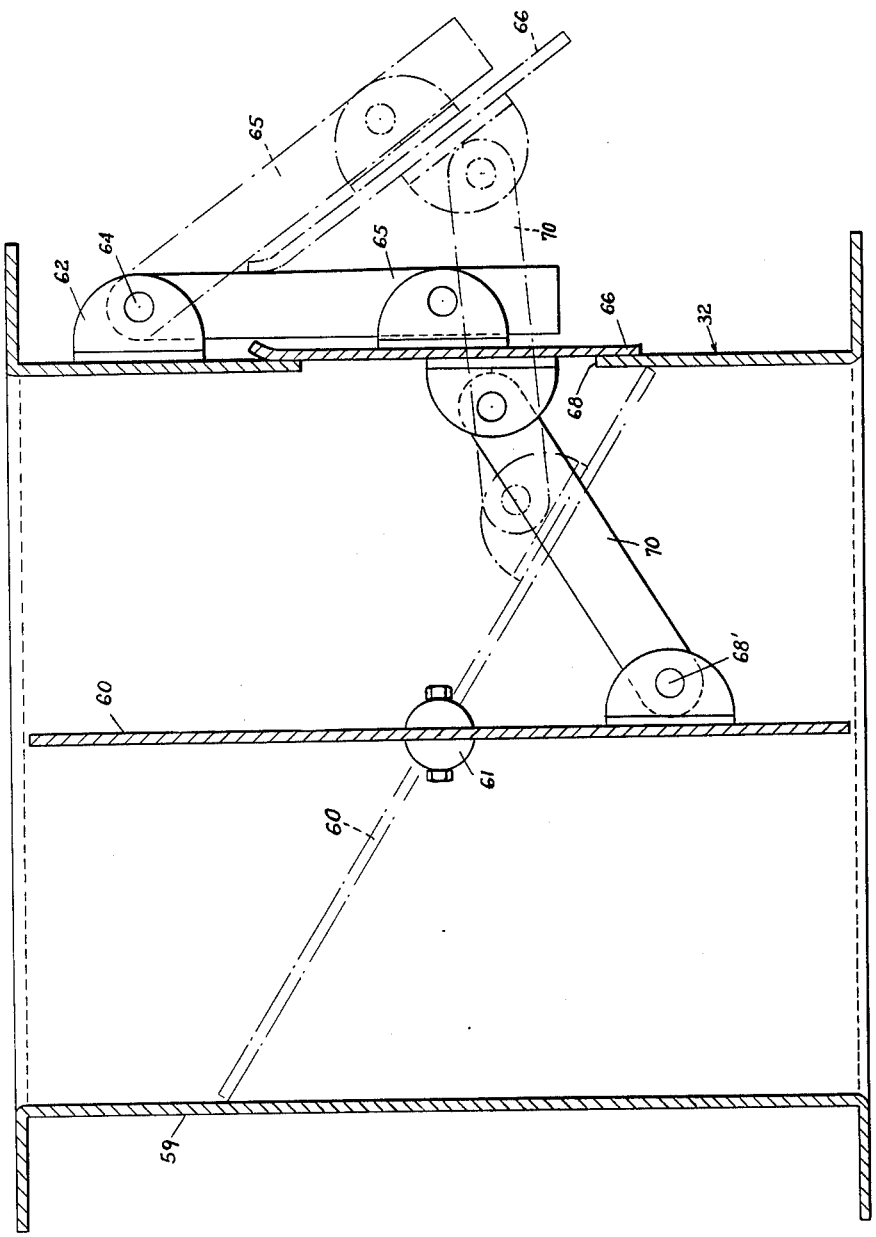

Dec. 21, 1965 L. A. EIBEN 3,224,172
DUST COLLECTING APPARATUS
Filed Aug. 17, 1961 5 Sheets-Sheet 4
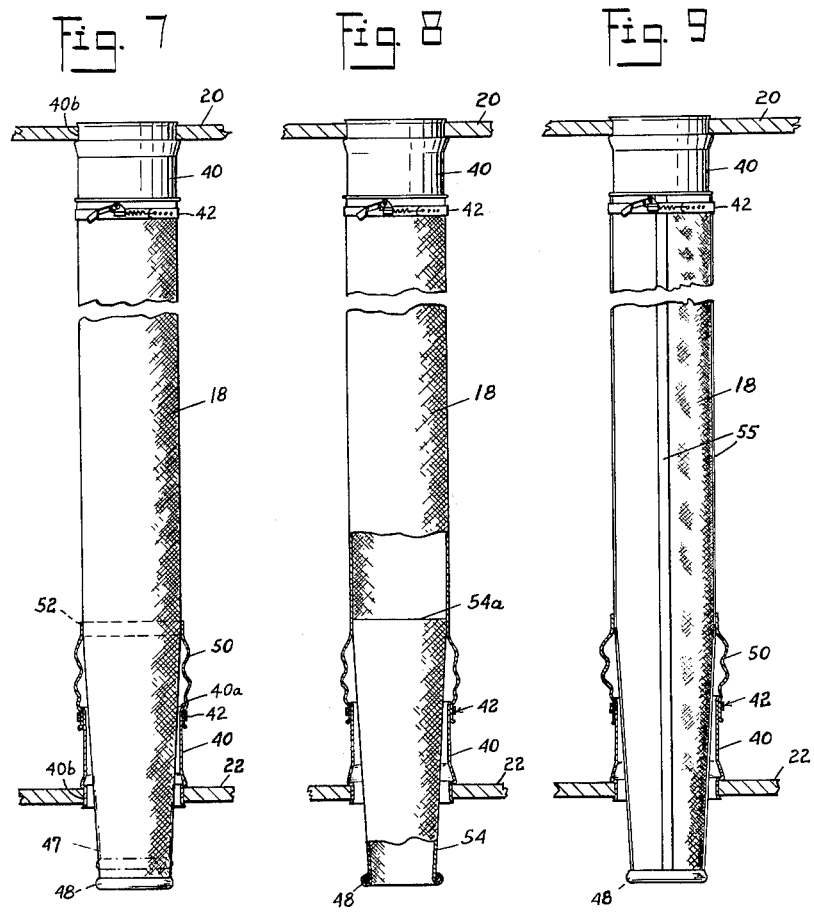
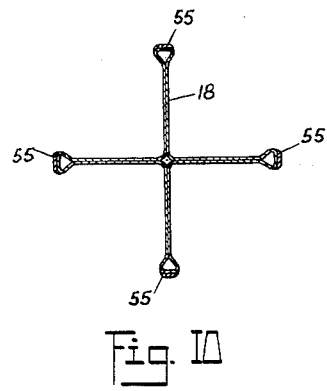
INVENTOR.
LAWRENCE A. EIBEN
BY
Teare, Fetzer & Teare
ATTORNEYS Dec. 21, 1965 L. A. EIBEN 3,224,172
DUST COLLECTING APPARATUS
Filed Aug. 17, 1961 5 Sheets-Sheet 5

INVENTOR.
LAWRENCE A. EIBEN
BY
Teare, Fetzer & Teare
ATTORNEYS

United States Patent Office 3,224,172
Patented Dec. 21, 1965

3,224,172
DUST COLLECTING APPARATUS
Lawrence A. Eiben, Cleveland, Ohio, assignor to Buell Engineering Company, Inc., New York, N.Y., a corporation of Delaware
Filed Aug. 17, 1961, Ser. No. 132,231
2 Claims. (Cl. 55—303)

This invention relates in general to apparatus for removing solids from gases and more particularly to devices known as dust collectors.

Apparatus of the type with which this invention is concerned generally comprise a plurality of collecting units including a plurality of elongated, fabric filter bags associated with each of the units. The collecting units are generally connected at one end to a dust pipe and at the other end to a clean air pipe, and a blower mechanism is utilized for forcing the air through the bags to collect the dust on the bags' interiors. In the past, the filter bags have been generally closed at one end and the dust laden air entered the open ends of the bags with the air then passing outwardly or transversely through the bag fabric while the dust was trapped on the interior of the bags, and then the clean filtered air was passed to the clean air pipe or manifold for transmission to a predetermined location. Conventional practice also has been generally to provide some mechanism for mechanically shaking the bags to cause discharge of the collected dust from the interiors thereof.

The present invention provides a dust collecting apparatus wherein the filter bags of the collecting units are open at both ends, and wherein the bags are cleaned or emptied of the collected or trapped dust by alternately collapsing and reinflating the bags in a reverse air flow operation. The inlet ends of the bags for entry of the dust laden air are preferably at the tops thereof, whereby the collected dust in the bags will fall in the same flow direction as the newly admitted incoming dust laden air during the cleaning operation, thereby substantially eliminating re-entrainment of the collected dust in the incoming air. The invention also provides an improved filter bag arrangement per se which results in perfect sealing conditions, preventing passage of dust from the dusty side of the bag to the clean side, and yet a bag which can be completely collapsed in a novel manner for cleaning purposes.

Accordingly an object of the invention is to provide an improved dust collecting apparatus.

Another object of the invention is to provide an improved dust collecting apparatus including a plurality of elongated vertically disposed filter bags wherein such filter bags are open at both ends, and including mechanism for collapsing the bags by means of a reverse air flow operation, for cleaning the bags of collected dust and other air contaminating particles.

A still further object of the invention is to provide an improved dust collecting apparatus including a plurality of elongated open ended filter bags which filter bags are adapted to be cleaned of dust by a reverse air flow operation resulting in collapsing the bags, and embodying an organizational arrangement which eliminates the heretofore used bag shaking mechanism which was necessary for mechanically shaking the bags to clean them of dust.

Another object of the invention is to provide a dust collecting apparatus which is simpler in construction and more economical to manufacture, as compared to heretofore known dust collecting apparatus.

A still further object of the invention is to provide a novel filter bag for dust collecting apparatus of the above mentioned type and embodying means providing for effective collapsing and reinflation of the bag during reverse air flow operations.

A still further object of the invention is to provide a filter bag of the latter mentioned type which is formed of fabric material having a slippery-like finish, such as siliconized cotton, glass or the like.

Other objects and advantages of the invention will be apparent from the following description taken in conjunction with the accompanying drawings wherein:

FIG. 6 is an enlarged vertical sectional view taken generally along the plane of line 6—6 of FIG. 4 looking in the direction of the arrows;

FIG. 7 is an enlarged, broken, partially sectioned, side elevational view of one of the filter bags of the invention, as mounted in the dust collecting apparatus; in dot-dash lines there is illustrated a position of the lower weighted end of the bag when the latter is collapsed for accomplishing cleaning thereof;

FIG. 8 illustrates a modified form of the bag of FIG. 7;

FIG. 9 is a further modification of the bag of FIG. 7;

FIG. 10 is a horizontal sectional view illustrating the collapsed condition of a filter bag and especially the bag of FIG. 9 during the air reversal operation utilized for cleaning purposes;

Figure 1:
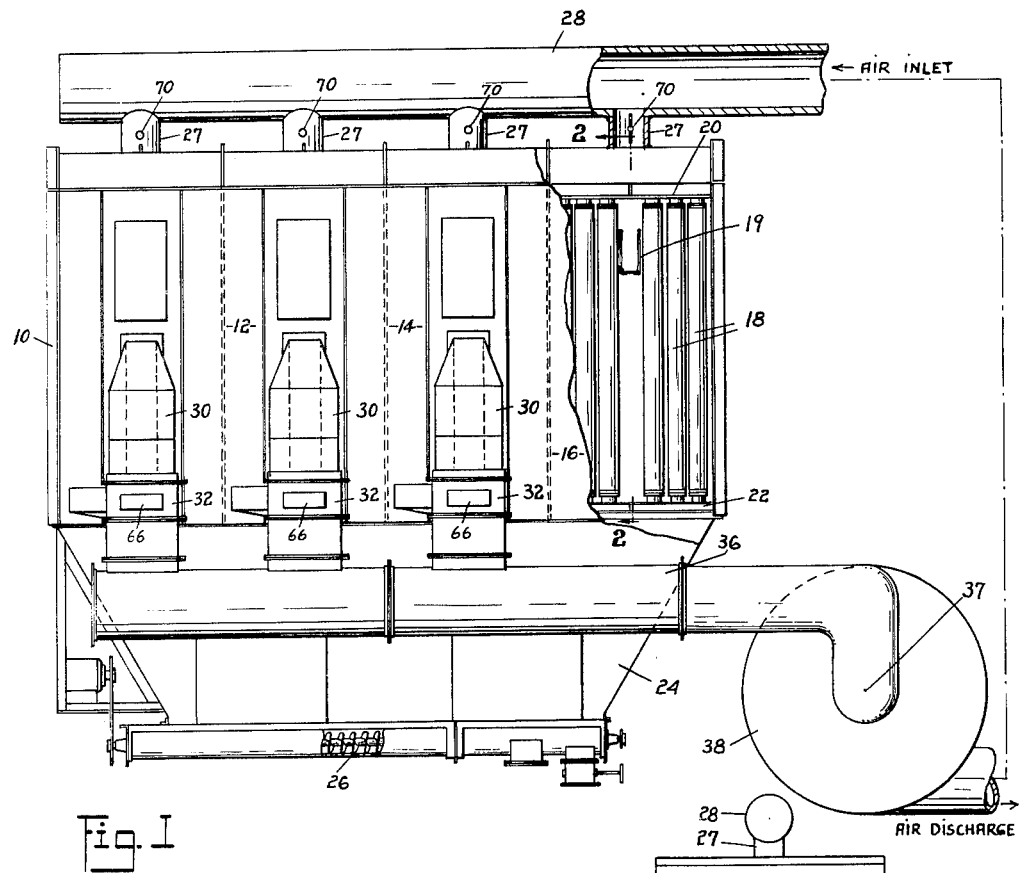
FIG. 1 is a partially broken, generally diagrammatic, side elevational view of a dust collecting apparatus embodying the present invention.

Referring now again to the drawings, there is illustrated a dust collecting apparatus having four filtering compartments or units 10, 12, 14 and 16, each of which contains a plurality of vertically oriented filter bags 18. An elongated walkway 19 may be provided in each of the compartments extending between confronting side walls thereof. In accordance with the instant invention, the bags are opened at both ends and connected at the tops thereof to upper apertured plate 20 of the dust collecting mechanism, and at the bottoms thereof to lower apertured plate 22 of the dust collecting mechanism, and in a manner to be hereinafter described. The units 10 to 16 may be mounted upon a hopper 24, at the base of which a screw conveyor 26 may be provided for removing the collecting dust. Extending across the top of each of the filtering compartments and communicating therewith via the preferably valve or baffle controlled ducts 27 may be a dust air duct 28, through which is passed the dust laden air. Downwardly from the side of each of the compartments there is provided exhaust ductwork 30 through which the air, after having passed through the walls of the bags in each of the compartments, is drawn, from whence it passes via damper or butterfly valve mechanism, generally indicated by reference number 32, to a manifold or clean air pipe 36, connected as at 37 to the suction side of fan or blower 38, from whence the clean air is transmitted by blower 38 to any desired location.

Figure 2:
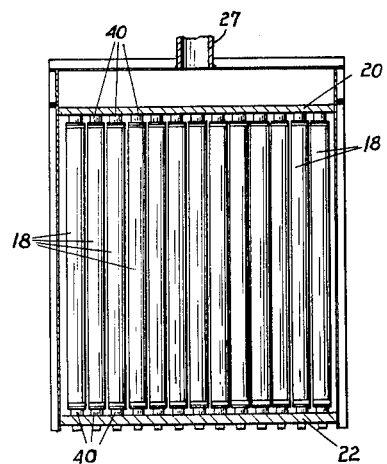
FIG. 2 is a vertical sectional view taken generally along the plane of line 2—2 of FIG. 1, looking in the direction of the arrows.
Figure 3:
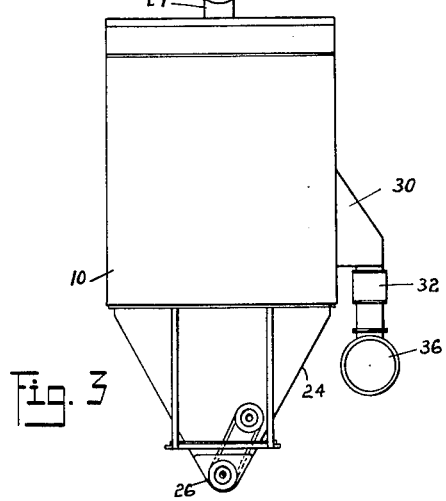
FIG. 3 is a reduced size, end elevational view of the FIG. 1 apparatus taken from the left-hand end of FIG. 1.
Figure 4:
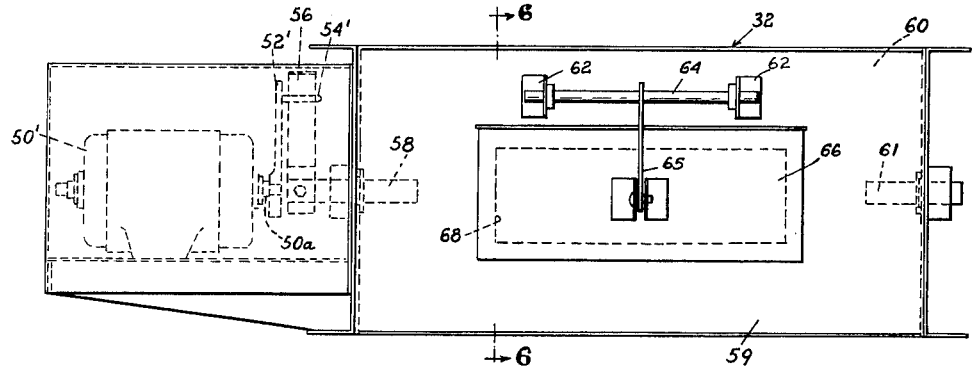
FIG. 4 is a side elevational detail view of a motorized air reversal valve, which provides for collapsing of the filter bags in the cleaning operation of the same.
Figure 5:
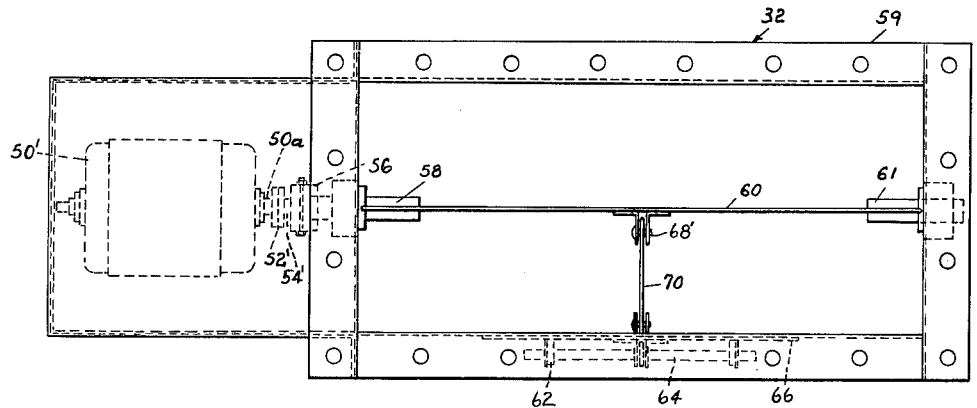
FIG. 5 is a top plan view of the FIG. 4 arrangement.

Referring now to FIGS. 2 and 7, the upper and lower plates 20 and 22 of the dust collecting apparatus may be provided with sleeves or collars 40 which are disposed in the openings in the upper and lower plates and which project inwardly into the respective units 10 to 16, for convenient attachment of the filter bags 18 thereto. The sleeves 40 may be readily formed or pressed out of sheet metal, and are preferably provided with a lip 40a at their inner ends and a recessed flanged section 40b at their outer ends, for convenient attachment to respectively the bags 18 and the plates 20 or 22. The sleeves of the thimbles 40 may also be attached to plates 20 and 22 by means of welds.

Figure 11:
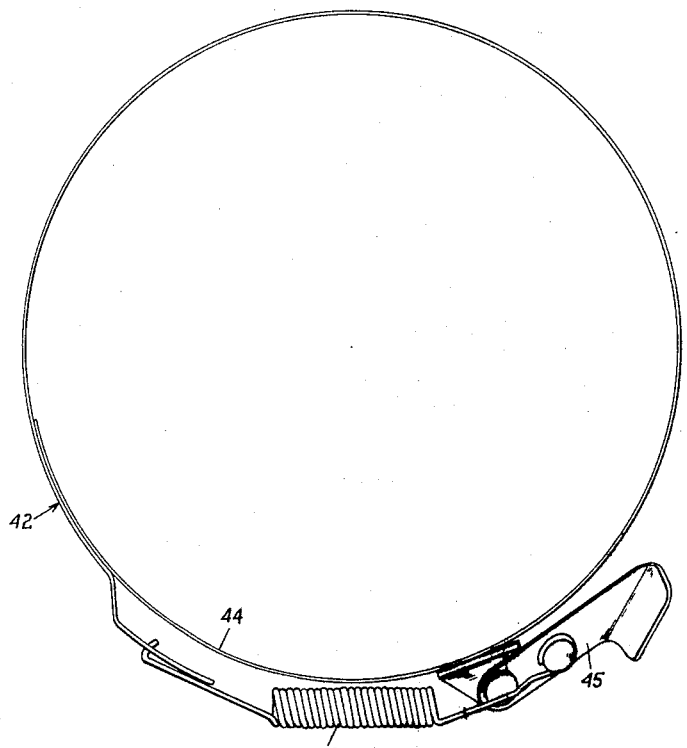
FIG. 11 is a top plan view of one of the clamps used to detachably secure the bag in operative position in the dust collecting apparatus.
Figure 12:
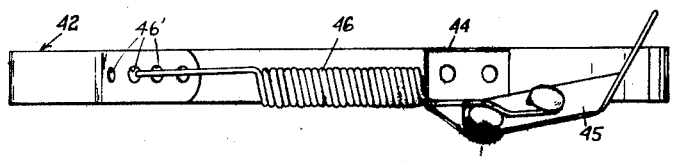
FIG. 12 is a side elevational view of the clamp illustrated in FIG. 11.

Bags 18, in the embodiment illustrated, are of conventional cylindrical form, and in accordance with the invention are open at both ends. The bags are preferably formed of a fabric material having a somewhat slippery-like finish, such as siliconized cotton, glass or "Dacron." The bags are attached at their upper ends to a respective sleeve 40 and as by means of an expansible band clamp 42, which as shown in FIGS. 11 and 12, comprises a band 44 having apertures 46' adjacent one end of the band, and a pivotal lever 45 connected to the band adjacent the latter's other end. A spring 46 extends between a selected one of the apertures 46' and the lever. Pivotal movement of the lever in one direction releases the clamp and permits the latter to expand, while pivotal movement in the opposite direction tensions the clamp against the resistance to expansion of the spring. Thus it will be seen that the bags are readily attached at their upper and lower ends to the respective sleeve on upper plate 20 and lower plates 22, for providing for expeditious replacement of the bags. The bags at their lower ends preferably comprise an inverted truncated conical shape section 47 and are provided with a weight 48 of predetermined mass adjacent such lower end. As shown, the lower end of each of the bags extends through the associated sleeve 40 and below the lower plate 22. The weight 48, acted upon by gravity, normally maintains the bag in generally taut, open condition. A shroud 50 is provided at the lower end of the bag and may be sewed thereto as at 52, while the lower end of the shroud is attached as by one of the aforementioned clamp means to the associated sleeve 40. The shroud is of sufficient axial length so as to be installed in a loose or non-taut condition, as illustrated in FIG. 7, for permitting the effective collapse of the bag during a reverse air flow operation for cleaning purposes and as will be hereinafter discussed.

Referring to FIG. 8, there is illustrated a modified form of a filter bag wherein the tapered bag section 54 is formed from a separate piece, and is sewed as at 54a above the lower end of the bag proper while the lower end of the bag proper is attached in loose relation to the associated sleeve 40, thereby resulting in a collapsible bag wherein the operation is generally similar to that of the FIG. 7 embodiment, but wherein there has been provided a reversal of the parts.

In FIG. 9 there is illustrated a further modified bag generally similar to that of FIG. 7 but wherein tapes 55 which may be of generally flexible material, are attached symmetrically around the bag's exterior and extending axially thereof. Such tapes help to ensure that the weighted end 48 of the bag will not open the fabric weave of the bag, thus keeping uniform porosity throughout the bag's length. The number of tapes may vary from two to any number, depending upon the bag's size and the mass of the weight. FIG. 10 illustrates a collapsed condition of such a "taped" bag with the wall portions of the bag intermediate the tapes having been moved or sucked inwardly, during an air reversal operation for cleaning purposes.

Referring now to FIGS. 3 and 4 to 6, there is disposed in each of the outlet ducts 30 one of the aforementioned mechanized air reversal valve mechanisms 32. Such mechanism comprises a motor unit 50', such as an electric motor, an electric solenoid, pneumatic cylinder or motor, to the shaft 50a of which is secured a generally upstanding arm element 52'. Arm element 52' is attached as by means of a link 54' in the form of a pin to valve arm 56, which in turn is secured adjacent its lower end to a rotatable shaft 58 rotatably mounted on duct section 59. Secured to shaft 58 is one side of a damper or butterfly plate 60. The other side of plate 60 is rotatably mounted on duct 59 by shaft 61. Pivotally mounted to the exterior of the duct section 59, and as by means of lugs 62, shaft 64 and link 65 assembly, is an air inlet door 66 which is adapted for closing opening 68 through the wall of the exhaust ductwork section 59. A link 70 is provided, pivotally connected at one end and as at 68', to the damper plate 60 and at the other end to the inner side of the door 66. Upon predetermined actuation of the motor unit, the damper plate is caused to pivot due to partial rotation of the shaft 58, and when disposed in the dot-dash position illustrated in FIG. 6, seals off the exhaust duct 36 from the interior of the associated collecting unit or chamber of the dust collecting apparatus. Such pivoting of the damper plate 60 causes outward pivoting of the link connected closure door 66, to thereby open the latter and permit atmospheric air to enter ductwork 59 above plate 60 and thence into the respective compartment or unit 10 to 16. As will be understood, the vertical position of the damper plate 60 in the ductwork 59 is the normal open position, while the dot-dash position illustrated in FIG. 6 is the completely closed position.

Operation of the dust collecting apparatus may be as follows: Actuation of the blower or fan unit 38 may cause transmission of dust laden air through the upper dust air duct 28 whereby the air is drawn downwardly and through the filter bags axially thereof, and due to the suction of the blower unit, the air passes transversely through the bags' walls whereupon the dust is trapped on the interior of the bags. The cleaned air then passes through the exhaust ductwork 30 and 59 and into the manifold clean air pipe 36 and thence is transmitted to the desired location. When it is desired to clean the filter bags in a particular chamber (e.g. 10 to 16) of the collected dust on the interiors of the respective bags, the motor unit 50' of the air reversal valve 32 on the collecting unit is actuated, thereby moving the baffle plate 60 to closed position, and stopping suction in this compartment, from the fan. Closing of plate 60 also opens door 66, which admits atmospheric or reverse air into ductwork 59, above plate 60, and thence into the respective compartment. This reverse air instead of being atmospheric air could be air piped, as for instance, from the discharge side of fan 38. The dust laden air passing through dust air pipe 28 bypasses the "closed" collecting unit or compartment, with resultant reverse air flow through the bags in the "closed" compartment, and upwardly from the latter. The bags in the "closed" compartment are thus caused to collapse, generally as illustrated in FIG. 10, whereupon the inner surfaces of the bags are moved into abutting relation, thereby loosening the dust on the inner surfaces of the bags and expediting or aiding in the removal or falling downwardly of the trapped dust from the bags' interior surfaces when the bags are reinflated. Also during collapse of the bags in the "closed" chamber or chambers, the bags are retracted in length, and the weighted ends of the bags rise to the general position illustrated in dot-dash lines in FIG. 7. This retraction is possible due to the "loose" condition of the shroud portion 50. Upon actuation of the motor to move the baffle plate to open condition, the dust laden air flowing through the dust pipe again enters the bags from the upper ends thereof and passes transversely through the sides of the bags, thereby reinflating or opening the bags. This opening of the bags and elongation thereof due to the weighted end of the bag falling downwardly, causes the dust to fall through the open bottom end of the bags and into the dust hopper. It will be seen that the dust being discharged from the interior of the bags moves downwardly in the same direction as the newly admitted dust laden air, and therefore the possibility of the collected dust in the bags becoming reentrained in the incoming dust laden air is negligible. The relatively slippery-like finish of the bags aids in the movement of the dust from the interior of the bags downwardly into the dust hopper 24, since such fabric has less retentivity of the dust as compared to heretofore known arrangements. The weights 48 on the ends of the bags, dropping downwardly during reinflation of the same, set up vibrating forces which assist in cleaning the bags.

While the invention has been shown with the dust laden air entering the upper end of the bags and the dust falling downwardly through the bags, and while this is the preferable arrangement, the operation could be reversed and the dust laden air could enter the bottom of the bags and the clean air exit from the upper end of the collecting unit. The advantage of the preferred arrangement, is as aforementioned, that dust is moving downwardly via gravity in the same direction as the incoming dust laden air and thereby tending to prevent reentrainment of the collected dust in the newly admitted air.

The valve or baffle plate mechanism 70 associated with each of the dust air entry ducts 27 may be utilized to close off the respective chamber or unit 10 to 16, and thereby provide for replacement of the bags in the associated unit without shutting down the entire dust collecting apparatus.

The terms and expressions which have been used are used as terms of description and not of limitation, and there is no intention in the use of such terms and expressions of excluding any equivalents of any of the features shown and described, or portions thereof, but it is recognized that various modifications are possible within the scope of the invention claimed.

I claim:
1. In a dust collecting apparatus comprising, an enclosed collection chamber, an elongated vertically oriented flexible fabric filter bag disposed in said chamber, said bag being open at both ends thereof, a dusty air duct including a dusty air inlet, the upper end of said bag being connected in sealed relation to said dusty air inlet to receive dust laden air therein and to pass the air through said bag and generally radially thereof into said chamber whereby the dust will be entrapped on the interior surfaces of said bag and clean air is exhausted from said chamber, a dust receiving means isolated from the chamber and adapted to receive dust from the interior of the bag, the lower end of said bag being connected in sealed relation to said dust receiving means, said bag being of sufficient axial length so as to be retractable and extensible in an axial direction for causing abutting engagement of the inner surfaces of the bag upon radial collapse thereof, while maintaining communication of the upper and lower ends of the bag with respectively the dusty air duct and the dust receiving means, said bag including a tubular-like member attached thereto intermediate the ends of the bag and extending below the bottom boundary of the bag proper and exteriorly of the chamber, said tubular-like member communicating with said dust receiving means, a weight secured to said tubular-like member for urging the bag into generally taut open condition, a clean air exhaust duct communicating with said chamber for exhausting the clean air from said chamber, valve means including duct means and a pivoted baffle plate in said duct means connecting said chamber to said clean air exhaust duct, said baffle plate being selectively movable from an open to a closed position to shut-off said chamber from said clean air exhaust duct and to by-pass newly admitted dust laden air through said dusty air duct for exhausting air from the interior of said bag, and means including an opening in said duct means and a closure door for said opening and attached pivoted linkage means pivotally connected to said baffle plate and to said closure door for admitting air into said chamber upon movement of said baffle plate toward a closed position, to cause said radial collapse of said bag and engagement of said inner surfaces thereof.

2. In a dust collecting apparatus comprising an enclosed collection chamber, said collection chamber having an upper apertured plate and a lower apertured plate, an enlongated vertically oriented flexible fabric filter bag disposed in said chamber between the apertures in said upper and lower plates, said bag being open at both ends thereof and being secured in sealed relation to said upper and lower plates, a dust air duct, the upper end of said bag communicating with said dusty air duct by means of the aperture in said upper plate for receiving dust laden air therein and to pass the air generally radially through said bag and into said chamber whereby the dust will be entrapped on the interior surfaces of said bag and clean air will be exhausted from said chamber a dust receiving means isolated from the chamber and adapted to receive dust from the interior of the bag, the lower end of said bag communicating in sealed relation with said dust receiving means, a clean air exhaust duct communicating with said chamber for exhausting the clean air from said chamber, means coacting between said bag and said lower plate providing for axial retraction and extension of the bag for causing abutting engagement of the inner surfaces of the bag upon radial collapse thereof while maintaining said secured relation to said plates, means coacting with the lower end portion of said bag for urging the latter into generally taut open condition, said means providing for axial retraction and extension comprising a shroud encompassing in secured relation the lower end portion of the bag, said shroud being of sufficient axial length so that when the bag is in said open condition, the shroud is in loose condition, valve means including duct means and a pivoted baffle plate in said duct means connecting said chamber to said clean air exhaust duct, said baffle plate being selectively movable from an open to a closed position to close off said chamber from said clean air exhaust duct and to by-pass newly admitted dust laden air through said dusty air duct for exhausting air from the interior of said bag, and means including an opening in said duct means and a closure door for said opening and attached pivoted linkage means pivotally connected to said baffle plate and to said closure door for admitting air into said chamber upon movement of said baffle plate toward a closed position to cause said radial collapse of said bag and engagement of said surface thereof.

References Cited by the Examiner
UNITED STATES PATENTS

| | | | |
|---|---|---|---|
| 1,655,875 | 1/1928 | Orr | 55—366 |
| 2,682,316 | 6/1954 | Kaufmann | 55—293 |
| 2,805,731 | 9/1957 | Kron | 55—371 |
| 2,885,028 | 5/1959 | Sylvan. | |
| 3,057,137 | 10/1962 | Perlis et al. | 55—341 |
| 3,078,646 | 2/1963 | Leech et al. | 55—303 |
| 3,097,410 | 7/1963 | Lincoln. | |

FOREIGN PATENTS

| | | |
|---|---|---|
| 145,514 | 11/1903 | Germany. |
| 535,316 | 10/1931 | Germany. |
| 853,372 | 10/1952 | Germany. |
| 488,129 | 7/1938 | Great Britain. |
| 842,527 | 7/1960 | Great Britain. |

HARRY B. THORNTON, *Primary Examiner.*